No. 617,003. Patented Jan. 3, 1899.
T. A. WILLARD.
TUBULAR ELECTRODE FOR STORAGE BATTERIES.
(Application filed Jan. 26, 1897.)
(No Model.)
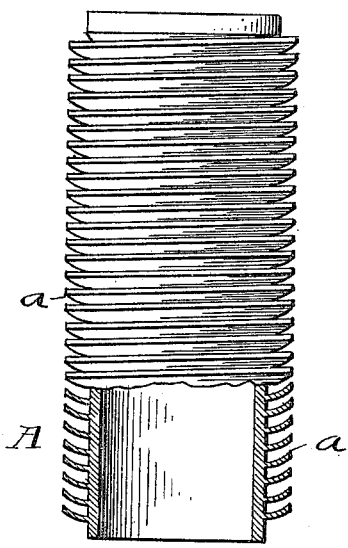
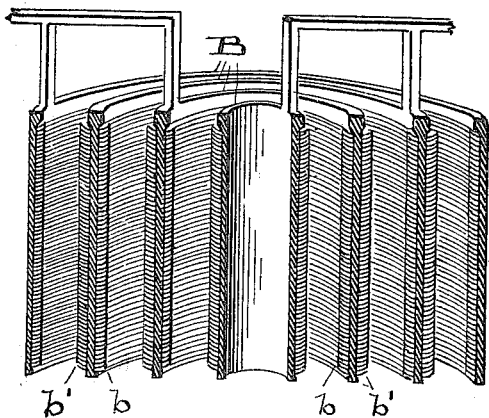
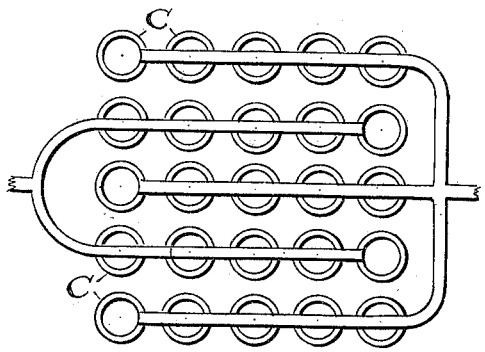
ATTEST
R. B. Moser
H. E. Mudra.
INVENTOR
Theodore A. Willard
By H. F. Fisher ATTY

UNITED STATES PATENT OFFICE.

THEADORE A. WILLARD, OF CLEVELAND, OHIO, ASSIGNOR, BY DIRECT AND MESNE ASSIGNMENTS, TO SIPE & SIGLER, OF SAME PLACE.

TUBULAR ELECTRODE FOR STORAGE BATTERIES.

SPECIFICATION forming part of Letters Patent No. 617,003, dated January 3, 1899.

Application filed January 26, 1897. Serial No. 620,766. (No model.)

*To all whom it may concern:*

Be it known that I, THEADORE A. WILLARD, a citizen of the United States, residing at Cleveland, in the county of Cuyahoga and State of Ohio, have invented certain new and useful Improvements in Tubular Electrodes for Storage Batteries; and I do hereby declare that the following is a full, clear, and exact description of the invention, which will enable others skilled in the art to which it appertains to make and use the same.

My invention has reference to tubular electrodes or elements for storage batteries of the type in which the active material is preferably converted or derived by electrical action directly from the surface of the electrode itself instead of having the active material applied mechanically or otherwise, as a paint, paste, or cement, although, of course, the latter method may also be used.

Specifically, therefore, the invention consists in a tubular or cylindrical storage-battery electrode having a succession of substantially saucer-shaped shelves or projections about its outside, substantially as shown and described, and particularly pointed out in the claim.

In the accompanying drawings, Figure 1 is an elevation of one form of tubular electrode embodying my invention, a portion at the bottom being broken away in section-lines and in which the series or succession of annular projections are, in fact, part of a continuous or spiral formation about the outside of the electrode and which is further distinguished by having the so-called "shelves" or "projections" saucer-shaped or inclined upward on curved lines. Fig. 2 is a sectional elevation of a group of elements of graduated sizes one within the other; and Fig. 3 is a plan view of a series of single tubes of the smaller sizes coupled together, as hereinafter fully described.

Referring now to the figures of illustration, the tube A (shown in Fig. 1) has a continuous spiral projection or ledge on its exterior from end to end and forming altogether a series of projections or shelves dished or curved in cross-section and inclined upward from their base to their outer upper edge, so there is produced, practically, a series of successive transversely-curved shelf-like projections $a$, serving the same purpose as if they were individual rather than continuous in their formation. The dish shape is especially advantageous for retaining the formed material, and the said projections being inclined contribute thereby to the retention of the material. A further advantage of this construction is the added strength of the projections $a$, which is obtained by reason of their peculiar shape and the fact that they confine the active material in a manner not possible with a straight construction.

If desired, tubes B, of graduated sizes in cross-section, as seen in Fig. 2, can be made so as to set one within or inside the other with a suitable intervening space, and as many as four different sizes, or even more, of these tubes can be arranged in this way and coupled up positive and negative alternately, suitable means being of course employed to insulate the tubes from each other; or, if preferred, a series of single tubes C of the smaller sizes and of the same size with each other, as seen in Fig. 3, can be coupled up as positive and negative members, respectively, thus giving a large number of small units to each cell. This leaves also each unit free from the other and affords plenty of room.

It will be noticed in Fig. 2 that some of the tubes shown therein have projections or ledges on their interior surface as well as upon their exterior surface, and in this particular style of cell all the tubes B have inside ledges $b$ but the inner one and all have outside ledges $b$ but the outer one.

What I claim is—

An electrode circular in cross-section, hollow through the center and having a series of annular ledges from top to bottom uniform in cross-section from edge to base and having uniform spaces between them, and curved outward and upward from their base, substantially as described.

Witness my hand to the foregoing specification this 15th day of January, 1897.

THEADORE A. WILLARD.

Witnesses:
H. T. FISHER,
R. B. MOSER.